April 7, 1970    N. N. BUCHSBAUM ET AL    3,505,176
VACUUM JET EJECTOR DISTILLATION FOR RECOVERY OF
TOLUENE DIISOCYANATE
Filed Feb. 26, 1968

INVENTORS
Norbert N. Buchsbaum
Utah Tsao

BY

*Marn & Jangarathis*

ATTORNEYS

United States Patent Office 3,505,176
Patented Apr. 7, 1970

3,505,176
VACUUM JET EJECTOR DISTILLATION FOR RECOVERY OF TOLUENE DIISOCYANATE
Norbert N. Buchsbaum, Clifton, and Utah Tsao, Jersey City, N.J., assignors to The Lummus Company, Bloomfield, N.J., a corporation of Delaware
Continuation-in-part of application Ser. No. 628,210, Mar. 13, 1967. This application Feb. 26, 1968, Ser. No. 719,823
Int. Cl. B01d 3/10
U.S. Cl. 203—73               6 Claims

ABSTRACT OF THE DISCLOSURE

A vacuum distillation process and system wherein the vacuum is maintained by a jet ejector employing an organic fluid which is compatible with the components to be recovered in the system. The process and system is particularly applicable to the recovery of toluene diisocyanate wherein monochlorobenzene is employed as the motive fluid, with the monochlorobenzene withdrawn from the ejector being passed to the recovery system to reduce toluene diisocyanate losses.

---

This application is a continuation-in-part application of patent application Ser. No. 628,210, filed Mar. 13, 1967 and now abandoned.

This invention relates generally to vacuum distillation. More specifically, this invention relates to vacuum distillation wherein the vacuum is produced by a jet ejector. Still more specifically, this invention relates to an improved vacuum system for recovering toluene diisocyanate.

Vacuum distillation is well known. The normal way to achieve vacuum is by the use of vacuum pumps or steam jet ejectors.

In a steam jet ejector, high pressure steam is forced through a discharge tube into the throat of a venturi, said throat communicating with the distillation system. Steam jets have the disadvantage that there is a danger of moisture backing into the process equipment where corrosion of the apparatus or reaction with process fluids would occur.

In a vacuum pump, vacuum is effected by mechanical means. Vacuum pumps have the disadvantages of high cost and the likelihood of contamination of the recovered vapor with the lubricant for the pump.

Both aforementioned vacuum systems have the disadvantage that some of the distillate product will be drawn into the vacuum generating system and lost thereto.

It is a principal object of the present invention to provide a novel apparatus and process for distillation under reduced pressure.

Another object of this invention is to provide a novel apparatus and process for distillation under reduced pressure whereby contamination of the recovered product would be reduced.

A further object of this invention is to provide an apparatus and process for distillation under reduced pressure whereby loss of the product to the vacuum system is reduced.

A still further object of this invention is to provide an apparatus and process for recovering distillate product normally lost to the vacuum system.

These and other objects, features and advantages of the present invention will become more apparent from the following description and the drawing.

Understanding of the invention will be facilitated by referring to the accompanying drawing, wherein.

Figure 3:
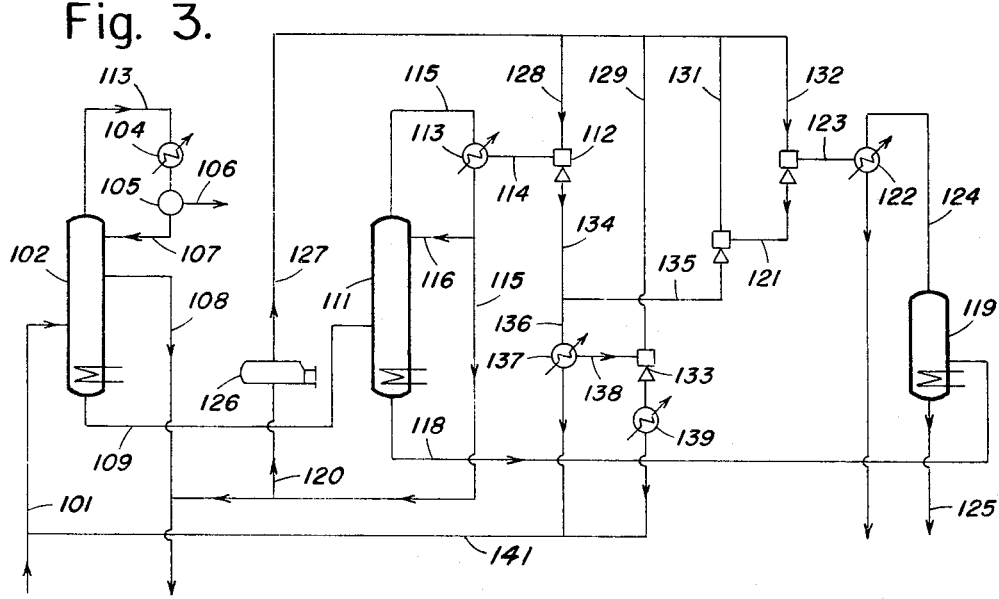
FIGURE 3 is a partial-schematic simplified drawing of an integrated vacuum distillation recovery system.

According to the present invention, a jet ejector is provided to maintain a vacuum in a vacuum distillation system and an organic compound which is compatible with the materials in the distillation system is employed as the motive fluid for the jet ejector. In accordance with a preferred embodiment of the present invention, the organic motive fluid withdrawn from the jet ejector, now containing some materials withdrawn from the distillation system, is passed to the distillation system wherein such materials are recovered. The organic compound is then passed from the distillation system to the jet ejector as the motive fluid therefor.

The jet ejectors employed are of a type generally known in the art and, consequently, no detailed description thereof is deemed necessary. The organic compound employed as the motive fluid, as hereinabove stated, is one which is compatible with the materials of the distillation system, and stable under the temperature and pressure conditions employed. In addition, the organic compound should have the properties which are generally considered as a prerequisite for an effective motive fluid, i.e., chemical stability, and an appreciable boiling point difference with respect to the organic material to be recovered. As representative examples of compounds which may be employed as motive fluids, there may be mentioned: aromatic compounds, such as monochlorobenzene, benzene, toluene and paraffins.

The invention will now be described in further detail with reference to embodiments thereof illustrated in the accompanying drawing. It is to be understood that the drawing is only illustrative of the invention and, therefore, the scope of the invention is not to be limited thereby.

Figure 1:
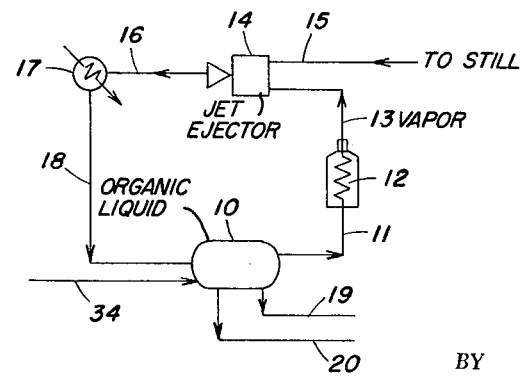
FIGURE 1 is a schematic, simplified drawing of the invention wherein the jet motivating vapor is condensed and cooled by indirect cooling means.

Referring now to FIG. 1, an organic liquid of a type hereinabove described, is withdrawn from a storage tank 10 through line 11 and passed through a heater 12, of a type known in the art, to effect vaporization thereof. The heater 12 may be provided with a pump (not shown) or other suitable means to increase the pressure of the resulting vapors. The organic vapor from heater 12 is passed through line 13 to a jet ejector, of a type known in the art, and generally indicated as 14. The organic vapor is employed as the motive fluid for the jet ejector, to create a vacuum in a distillation system (not shown), as generally known in the art. The jet ejector 14 is in fluid-flow communication with the distillation system (not shown) through line 15. In operation, some vapor in the distillation system (not shown) will be drawn into the vacuum line 15.

The organic vapor, now containing some vapor which was withdrawn from the distillation system (not shown) through line 15, is withdrawn from jet ejector 14 through line 16 and passed through a condenser 17 provided with a suitable coolant, such as brine, refrigerant, chilled water or the like, to effect condensation thereof by indirect heat transfer. The condensed organic vapor from condenser 17 is passed through line 18 to storage tank 10.

The storage tank 10 is provided with a line 34 for introducing make-up organic liquid, a line 19 for purging a portion of the organic liquid to prevent a buildup of the component withdrawn from the distillation system, and a line 20 for recycling a portion of the organic liquid to a reaction vessel (not shown) or the distillation system (not shown).

Figure 2:
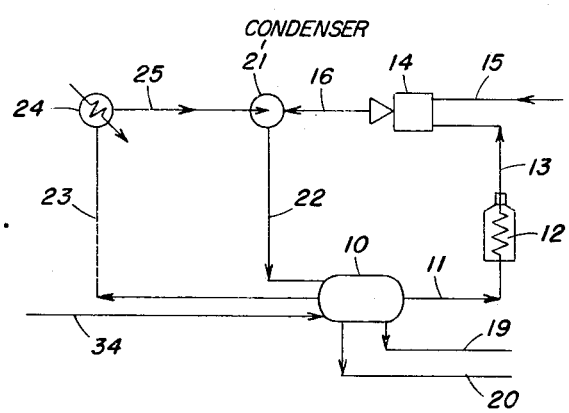
FIGURE 2 is a schematic, simplified drawing of the invention wherein liquid of the same composition as the jet motivating vapor is used for direct contact condensation of said jet motivating vapor.

Referring now to FIG. 2, wherein similar elements as those in FIG. 1 are referred to by like reference numerals, an organic liquid of a type hereinabove described, is withdrawn from storage tank 10 through line 11 and passed through heater 12 to effect vaporization thereof. The organic vapor from heater 12 is passed through line 13 to jet ejector 14. The organic vapor is employed as the motive fluid for the jet ejector to create a vacuum in a distillation system (not shown), as generally known in the art. The jet ejector 14 is in fluid-flow communication with the distillation system (not shown) through line 15. In operation, some vapor in the distillation system (not shown), will be drawn into the vacuum line 15.

The organic vapor, now containing some vapor which was withdrawn from the distillation system (not shown) through line 15, is withdrawn from jet ejector 14 through line 16 and passed to a condenser 21 to effect condensation thereof by direct heat transfer with chilled organic liquid of the same composition as the organic vapor. The condensed organic vapor from condenser 21 is passed through line 22 to storage tank 10. The storage tank 10 is provided with a line 34 for introducing make-up organic liquid, a line 19 for purging a portion of the organic liquid to prevent a build-up of the component withdrawn from the distillation system, and a line 20 for recycling a portion of the organic liquid to a reaction vessel (not shown) or the distillation system (not shown). A portion of the organic liquid is withdrawn from tank 10 through line 23 and passed through a cooler 24, or other suitable cooling means, to effect cooling thereof. The cooled organic liquid is withdrawn from cooler 24 thrugh line 25 and passed to condenser 21 wherein the cooled organic liquid is admixed with the organic vapor introduced through line 15 to effect condensation thereof.

The invention will now be further described with reference to recovering toluene diisocyanate from a process wherein toluene diamine and phosgene are reacted in monochlorobenzene. Referring now to FIG. 3, which illustrates a portion of the recovery system for recovering toluene diisocyanate, the effluent from the toluene diisocyanate (TDI) reaction system, containing TDI, hydrogen chloride, phosgene, other by-products, such as urea, and the reaction solvent, monochlorobenzene, in line 101 is introduced into a fractionator 102 to separate phosgene and hydrogen chloride from the effluent. An overhead, containing phosgene and hydrogen chloride, is withdrawn from fractionator 102 through line 103, passed through condenser 104 to effect partial condensation thereof and the gas-liquid mixture introduced into reflux drum 105. The gaseous portion is withdrawn from drum 105 through line 106 and passed to separation and recovery (not shown). The liquid portion is withdrawn from drum 105 through line 107 and introduced into fractionator 102 as reflux.

A liquid sidestream, containing monochlorobenzene, is withdrawn from fractionator 102 through line 108 and recycled to the TDI reaction system (not shown). A bottoms, essentially free of phosgene and hydrogen chloride, is withdrawn from fractionator 102 through line 109 and introduced into a fractionator 111 to recover monochlorobenzene. The fractionator 111 is operated at below atmospheric pressure and the vacuum is maintained by the means of a jet ejector 112, connected to an overhead condensed 113 through line 114.

An overhead, containing monochlorobenzene, is withdrawn from fractionator 111, through line 115, condensed in condenser 113 and a portion thereof introduced into fractionator 111 as reflux through line 116. The major portion of the monochlorobenzene remaining in line 115 is recycled to the TDI reaction system (not shown) and the remaining portion passed through line 120 as motive fluid for the jet ejectors employed for maintaining a vacuum in the recovery system, as hereinafter described.

A bottoms, essentially free of monochlorobenzene, is withdrawn from fractionator 111 through line 118 and introduced into an evaporator 119 to recover crude TDI. The evaporator 119 is operated at below atmospheric pressure and the vacuum is maintained by a two-stage jet ejector 121 connected to the condenser 122 for the evaporator 119 through line 123.

A gaseous effluent, containing crude TDI, is withdrawn from evaporator 119 through line 124, condensed in condenser 122 and passed to further purification (not shown). The unevaporated residue is withdrawn from evaporator 119 through line 125.

The liquid monochlorobenzene in line 120 is passed through a heater 126 to effect vaporization thereof. The monochlorobenzene vapor withdrawn from heater 126 through line 127 is passed through lines 128 and 129 as the motive fluid for jet ejectors 112, 133, respectively, and through lines 131 and 132 for the two stage jet ejector 121. The jet ejector 112 maintains a vacuum in the fractionator 111 and the two stage jet ejector 121 maintains a vacuum in the evaporator 119. The vapor withdrawn from jet ejector 112 and two-stage jet ejector 121 through lines 134 and 135, respectively, now containing a minor portion of TDI and other components withdrawn from the recovery system, is combined in line 136 and passed through a condenser 137 to effect condensation thereof. The condenser 137 is maintained at below atmospheric conditions by the jet ejector 133 connected thereto through line 138. The vapor withdrawn from jet ejector 133 is condensed in condenser 139 and combined in line 141 with the condensed vapor from condenser 137. The liquid in line 141, containing a dilute solution of TDI and other compounds, in monochlorobenzene, is recycled to the fractionator 102 to recover the TDI.

The crude TDI, recovered from evaporator 119 is further purified by vacuum distillation, as known in the art, and the vacuum for such distillation may be maintained, as hereinabove described, by employing monochlorobenzene as a motive fluid for a series of jet ejectors.

The invention is further illustrated by the following example, but the scope of the invention is not to be limited thereby.

EXAMPLE

The following conditions are employed for recovering TDI in accordance with the embodiment illustrated in FIG. 3.

Fractionator 102:
    Overhead temp.—273° F.
    Bottoms temp.—329° F.
    Pressure—7 mm. Hg abs.

Fractionator 111:
    Overhead temp.—131° F.
    Bottoms temp.—311° F.
    Pressure—40 mm. Hg abs.

Fractionator 119:
    Temp.—261° F.
    Pressure—15 mm. Hg abs.

VACUUM SYSTEM

| Line | Temp., ° C. | Pressure (atm.) | Flow rate, lb./hr. |
| --- | --- | --- | --- |
| 128 | 245 | 10 | 1,000 |
| 129 | 245 | 10 | 1,000 |
| 131 | 245 | 10 | 1,000 |
| 132 | 245 | 10 | 1,000 |

The fluid in line 141 is a solution of TDI in monochlorobenzene having a concentration of TDI varying from traces up to about 1%.

Although the invention has been described with reference to the recovery of toluene diisocyanate, it is to be understood that the invention is equally applicable to the vacuum distillation of other materials, and in particular, water sensitive materials, such as, other isocyanates, acid chlorides, anhydrides, esters and tertiary alkylhalides.

It is also to be understood that the invention is not restricted to the use of monochlorobenzene as a motivating fluid for the jets, and that any organic fluid, compatible with the system components, may be employed.

The present invention has numerous advantages over those vacuum systems previously employed in the art, including the elimination of the chances of a contaminating fluid entering the recovery system and the reduction of valuable product loss into the vacuum system. These and other advantages should be apparent to those skilled in the art from the teachings contained herein.

Numerous modifications and variations of the present invention are possible in light of the above teachings and, therefore, it is to be understood that within the scope of the appended claims, the invention may be practiced otherwise than as particularly described.

What is claimed is:

1. In a process for recovering toluene diisocyanate wherein the effluent from a toluene diisocyanate reaction system employing monochlorobenzene as a reaction solvent is passed through a separation and recovery system containing a plurality of below atmospheric pressure separation zones, the below atmospheric pressure being maintained in said zones by jet ejectors, an improvement comprising:
   (a) passing monochlorobenzene vapor through the jet ejector as the motive fluid therefor, withdrawing the monochlorobenzene from the jet ejector, said monochlorobenzene now containing some toluene diisocyanate and passing at least a portion of the monochlorobendene to the separation and recovery system to recover the toluene diisocyanate therefrom.

2. The process defined by claim 1 and further comprising: withdrawing monochlorobenzene from the separation and recovery system and passing said monochlorobenzene to the jet ejector.

3. A process for recovering toluene diisocyanate from a reaction effluent including toluene diisocyanate, phosgene, hydrogen chloride and a reaction solvent, comprising:
   introducing the effluent into a first separation zone wherein hydrogen chloride and phosgene are recovered from the effluent;
   introducing the remaining effluent into a second separation zone wherein the reaction solvent is separated from the effluent, said second separation zone being maintained at a pressure below atmospheric pressure by a jet ejector;
   introducing the remaining effluent into a third separation zone to separate toluene diisocyanate therefrom, said third separation zone being maintained at a pressure below atmospheric pressure by another jet ejector; and
   passing at least a portion of the reaction solvent recovered from the second separation zone through the jet ejectors as motive fluids therefor.

4. The process as defined by claim 3 wherein motive fluid from the jet ejectors is introduced into the first separation zone.

5. The process as defined in claim 4 wherein the reaction solvent is monochlorobenzene.

6. The process as defined in claim 5 wherein the motive fluid is employed in vapor form and vapor from the jet ejectors is condensed in a below atmospheric pressure condenser, said below atmospheric pressure being maintained in the condenser by a jet ejector provided with motive fluid of vaporized reaction solvent recovered from the second separation zone.

References Cited

UNITED STATES PATENTS

| 2,338,583 | 1/1944 | Hickman et al. | 230—92 |
| 2,822,373 | 2/1958 | Beck. | |
| 2,823,221 | 2/1958 | Pfirschke et al. | |
| 2,905,731 | 9/1959 | Seed | 203—91 |
| 3,140,305 | 7/1964 | Lowenstein. | |
| 3,184,493 | 5/1965 | Kunze et al. | 260—453 |
| 1,600,106 | 9/1926 | Fothergill. | |
| 2,379,436 | 7/1945 | Hickman et al. | 230—101 X |
| 2,501,276 | 3/1950 | Hickman. | |

OTHER REFERENCES

Chemical Technology "Othmer" (1957), vol. 5, pp. 244–245.

NORMAN YUDKOFF, Primary Examiner

F. E. DRUMMOND, Assistant Examiner

U.S. Cl. X.R.

260—453; 202—205